United States Patent [19]

Marmonier

[11] Patent Number: 5,216,574
[45] Date of Patent: Jun. 1, 1993

[54] COMPONENT FOR A METAL-CLAD STATION FOR SECTION SWITCHING AND GROUNDING

[75] Inventor: Jean Marmonier, Aix les Bains, France

[73] Assignee: Gec Alsthom SA, Paris, France

[21] Appl. No.: 916,721

[22] Filed: Jul. 22, 1992

[30] Foreign Application Priority Data

Jul. 23, 1991 [FR] France .................. 91 09282

[51] Int. Cl.⁵ .............................................. H02B 5/00
[52] U.S. Cl. .............................. 361/335; 200/11 B; 200/150 C; 200/273; 200/275; 361/341
[58] Field of Search ............... 200/11 R, 11 B, 155, 200/144 A, 144 B, 148 R, 148 H, 149, 150 C, 273, 275, 286; 361/335, 341, 355, 361

[56] References Cited

FOREIGN PATENT DOCUMENTS

3035870 4/1981 Fed. Rep. of Germany .
425107 3/1935 United Kingdom .
2053571 2/1981 United Kingdom .
2193843 2/1988 United Kingdom .

*Primary Examiner*—Gregory D. Thompson
*Attorney, Agent, or Firm*—Sughrue, Mion, Zinn, Macpeak & Seas

[57] ABSTRACT

A switching component for a metal-clad station provides the equivalent of three three-phase section switches respectively disposed on two outlets powering sets of three-phase busbars and allowing grounding of the section switches upstream therefrom. The section-switching and grounding are performed by first contact parts engagable with second contact parts electrically connected together and to ground, and third contact parts. The second contact parts and the third contact parts are carried by a common shaft rotatable about the shaft axis.

5 Claims, 10 Drawing Sheets

COMPONENT FOR A METAL-CLAD STATION FOR SECTION SWITCHING AND GROUNDING

The present invention relates to electrical installations in grounded metal shielding, also referred to as "metal-clad type installations".

More precisely, the invention relates to the functions of "section-switches" and "associated grounding switches" for an installation including two outlets.

BACKGROUND OF THE INVENTION

Figure 1:
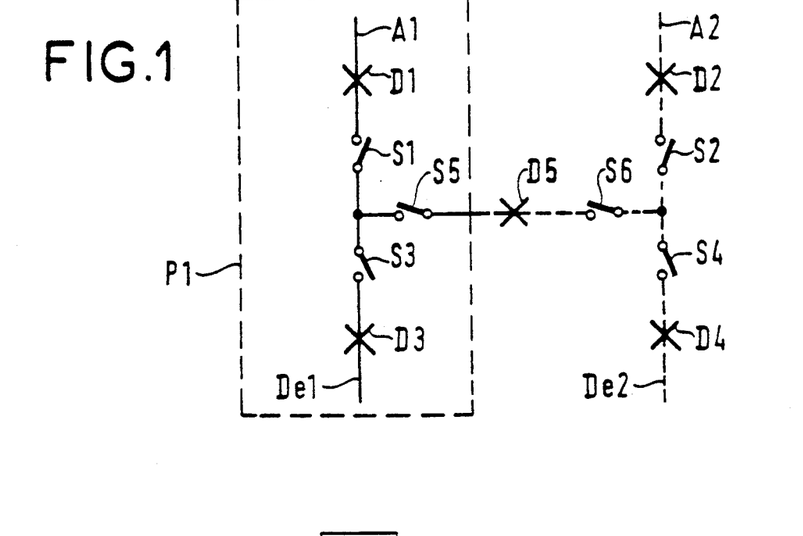
FIG. 1 is a diagrammatic view of an H-station.

FIG. 1 is a circuit diagram of an H-station. On inlets A1 & A2, FIG. 1 shows circuit-breakers D1 & D2 which can be isolated by section switches S1 & S2, and on outlets De1 & De2, FIG. 1 shows circuit-breakers D3 & D4 which can be isolated by section switches S3 & S4, and between the two branches, FIG. 1 shows circuit-breaker D5 flanked by section switches S5 & S6. Below, only half of such a station is considered, e.g. the portion P1 surrounded by the dashed line L, it being understood that the rest of the station is symmetrically identical.

Figure 2:
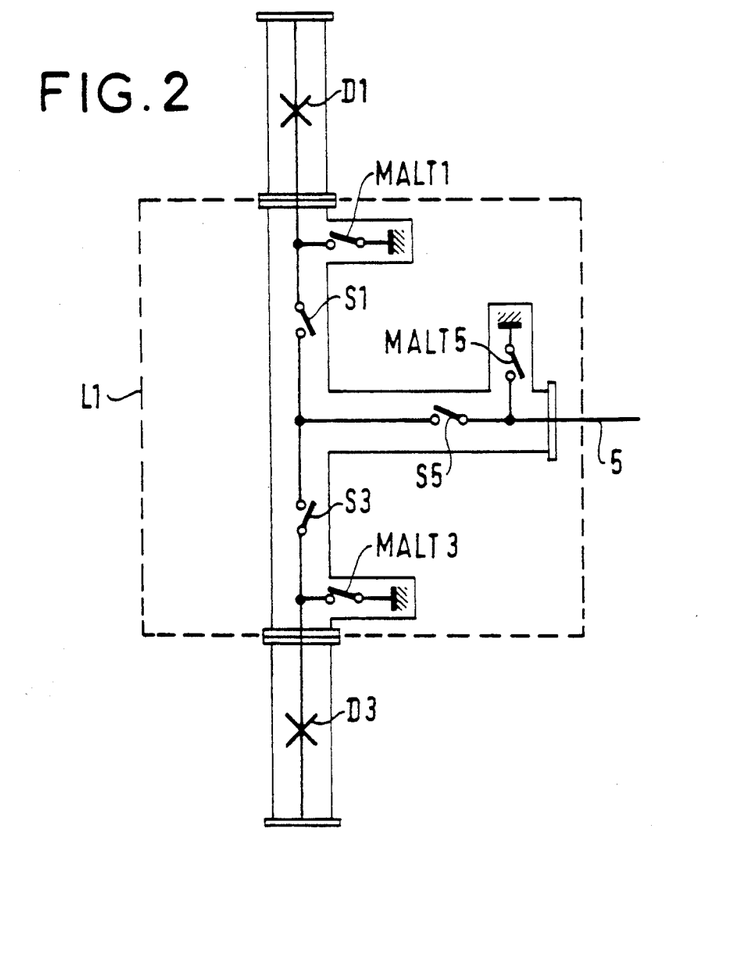
FIG. 2 is a diagram showing the component parts of the FIG. 1 station.

Conventionally, the station is made by means of distinct components assembled end-to-end. FIG. 2 shows the half-station P1 comprising the various component parts which are given the same references as in FIG. 1. In addition, the grounding devices for upstream grounding of the section switches S1, S3, and S5 are respectively referenced MALT1, MALT3, and MALT5. The reference 5 designates the outlet set of busbars.

Such a technique suffers from drawbacks essentially relating to implementation costs. Each component must be connected to the adjacent component in gastight manner, and this requires a great many busbar support inserts, coupling rings, fixing bolts, etc. and a considerable length of time for installation. Furthermore, each section switch must include a drive member.

An aim of the invention is to provide a station obtaining a large saving in implementation costs while retaining identical service availability.

SUMMARY OF THE INVENTION

The basic principle of the invention is to reduce the manufacturing costs of a station by providing a component including a single moving assembly both for the functions of the section switches S1, S3, & S5, and for the functions of the grounding switches MALT1, MALT3, & MALT5 (region surrounded by the line L1 in FIG. 2).

Continuity of service in the event of component failure is identical to that obtained with equipment of known type having one individual control per component.

In order to work on a section switch for a set of busbars in a conventional metal-clad station, it is necessary to switch off the power to the set of bus bars. The saving made by putting the six above-mentioned functions on a common moving assembly is not therefore achieved at the expense of ease of operation. In other words, continuity of service in the event of failure in the component of the invention remains unchanged. Indeed, overall continuity of service is improved due to the reduction in the number of components in the station, and in particular the number of rotary components (one instead of six).

BRIEF DESCRIPTION OF THE DRAWINGS

Embodiments of the invention are described by way of example with reference to the accompanying drawings, in which.

DETAILED DESCRIPTION

FIGS. 1 and 2 are described above, and no further reference is made to them.

Figure 3:
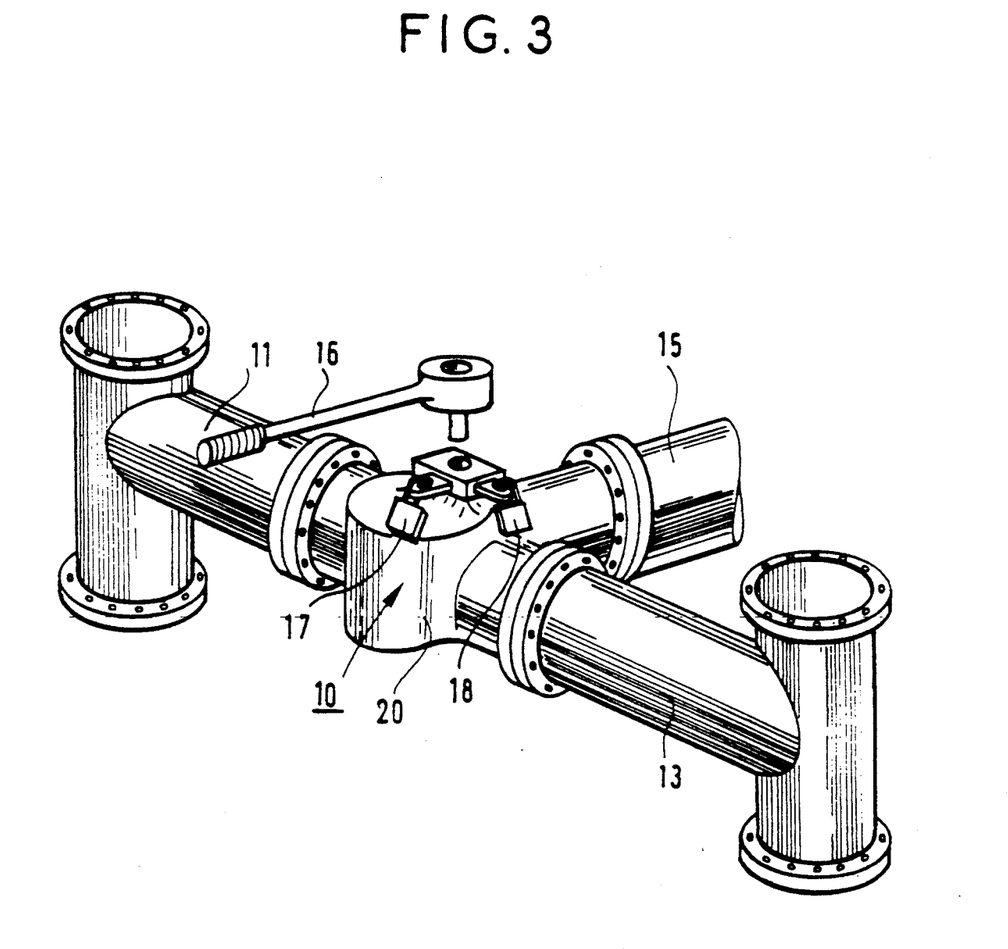
FIG. 3 is a fragmentary view of a metal-clad station into which a component of the invention is inserted.

FIG. 3 shows how a component of the invention (given overall reference 10) is inserted into a station, the figure showing the cladding 11 enclosing the circuit-breaker D1, the cladding 13 enclosing the circuit-breaker D3, and part of the cladding 15 enclosing the set of busbars referenced 5. FIG. 3 also shows the drive lever 16 for driving the component 10, and the padlocks 17 and 18 respectively preventing the section switches S1, S3, and S5 from being opened and from being grounded. Any other locking system is possible.

Figure 4:
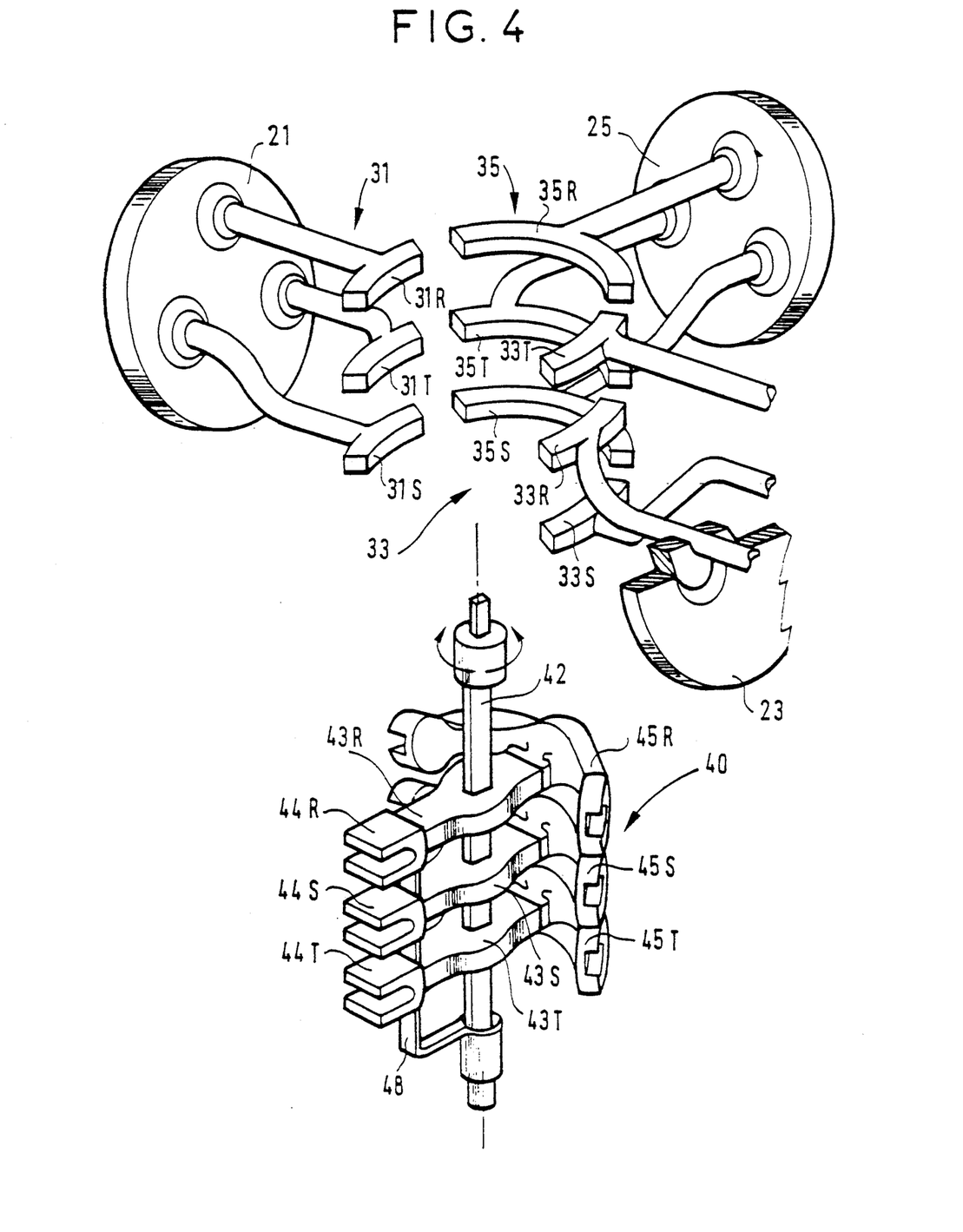
FIG. 4 is an exploded view in perspective of a first embodiment of the component of the invention.

FIG. 4 is an exploded view of a first embodiment of the component of the invention.

The metal cladding referenced 20 in FIG. 3 is not shown in FIG. 4.

Inside the cladding there is a fixed assembly comprising three insulating inserts 21, 23, and 25 through which phase conductors pass, which phase conductors are designated by the letters R, S, and T. Inserts 21 and 23 are disposed diametrically opposed in axial alignment and they respectively delimit the component at the end closest to circuit-breaker D1 and at the end closest to circuit-breaker D3. The axis of insert 25 is perpendicular to the common axis of inserts 21 and 23, and insert 25 delimits the component at its end closest to circuit-breaker D5.

The groups of three-phase busbars are referenced 31, 33, and 35, they are carried respectively by inserts 21, 23, and 25, and they correspond to the two outlets De1, De2 and to the set of busbars 5 FIG. 1.

The busbars in set 31 carry male contacts 31R, 31S, & 31T, in the form of circular arcs extending over about 50 degrees of arc (more generally, in the range 45 degrees to 65 degrees). Likewise, the busbars in set 33 carry male contacts 33R, 33S, & 33T in the form of circular arcs extending over about 50 degrees of arc. The busbars in set 35 carry male contacts 35R, 35S, & 35T in the form of circular arcs extending over about 100 degrees of arc (more generally, in the range 90 degrees to 110 degrees). The contacts in the set of busbars 35 are separated from the contacts in the sets 31 and 33 by a distance corresponding to about 20 degrees of arc (more generally, in the range 15 degrees to 30 degrees), and this is sufficient to maintain the isolation distance.

The component includes a moving assembly which is given overall reference 40. The moving assembly includes a shaft 42 passing through the cladding 20 of the component in gastight manner, and driven by the drive lever 16 outside the component.

The shaft 42 carries three parallel insulating arms 43R, 43S, & 43T. One end of any given arm, e.g. arm 43R, carries a contact jaw 44R designed to engage electrically with the arcuate contacts 31R, 33R, & 35R. The other end of the arm 43R carries a contact constituted by an arcuate jaw 45R which can also engage with the above-mentioned arcuate male contacts.

The jaw 45R can come into contact with the male contacts in all three of the groups of busbars 31, 33, & 35, and in any event comes simultaneously into contact with two of the groups 31, 33, 35. To this end, the jaw 45R is in the form of a circular arc extending over an angle of 140 degrees, and more generally an angle lying in the range 125 degrees to 155 degrees.

Arms 43S and 43T are equipped with contact jaws 44S, 44T, 45S, 45T, respectively which are identical to the contact jaws on arm 43R, and which are referenced in the drawings by the same numerals respectively assigned the letters S and T.

Jaws 44R, 44S, & 44T are interconnected by a common conductor 48 which is connected to ground.

By rotating the shaft 42, it is possible to set up the various electrical configurations that are necessary during operation or maintenance of a station.

Figure 5:
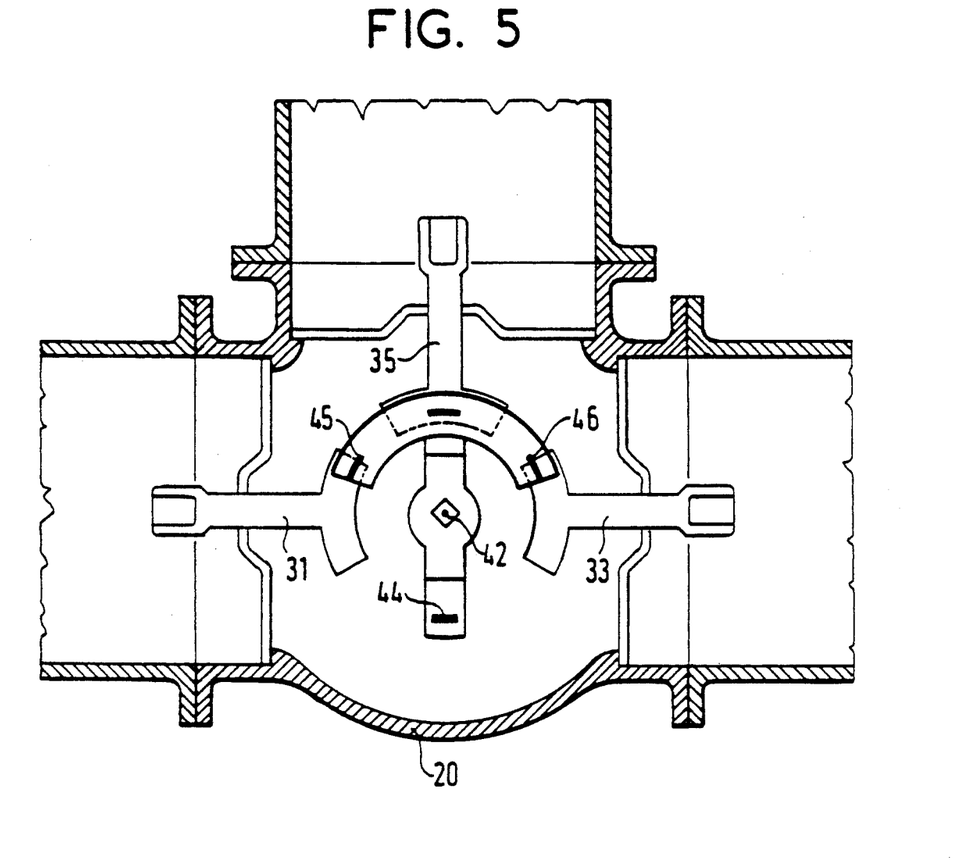
FIGS. 5 & 5A, 6 & 6A, 7 & 7A, 8 & 8A, 9 & 9A, and 10 & 10A are views showing the various positions taken up by the component, and the corresponding circuit diagrams.
Figure 5A:
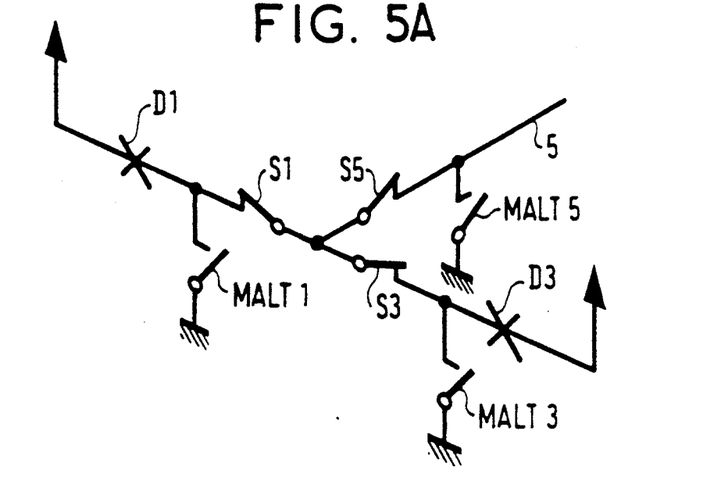

FIG. 5 shows the position of the shaft for the electrical configuration shown in FIG. 5A, namely section switches S1, S3, & S5 closed, via contacts 45, 46 and grounding switches MALT1, MALT3, & MALT5 contacts 44 open.

Figure 6:
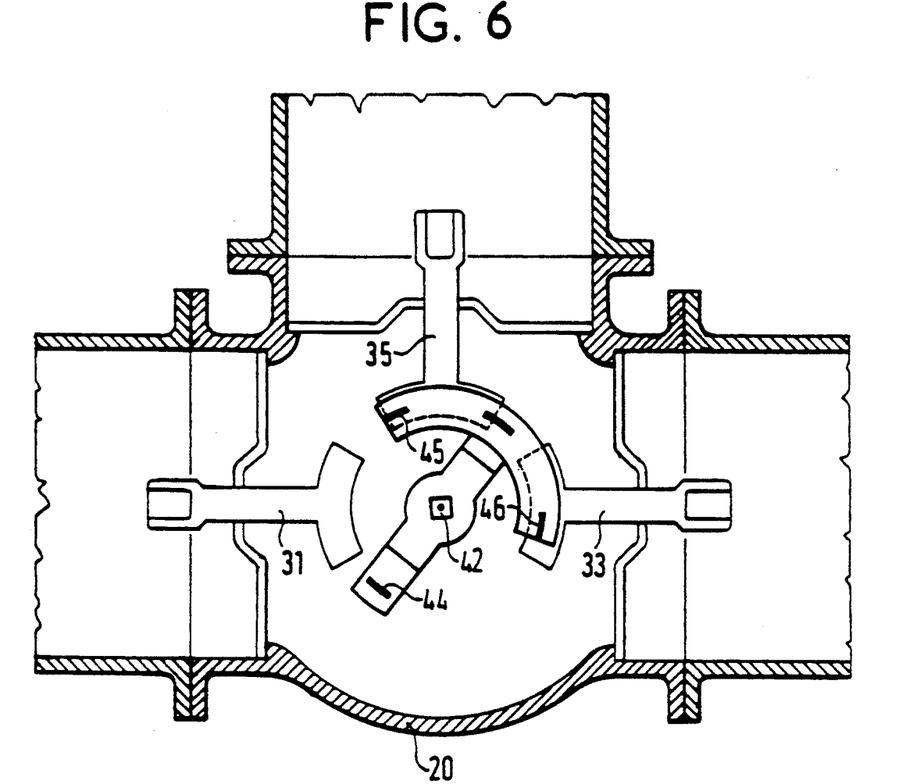
Figure 6A:
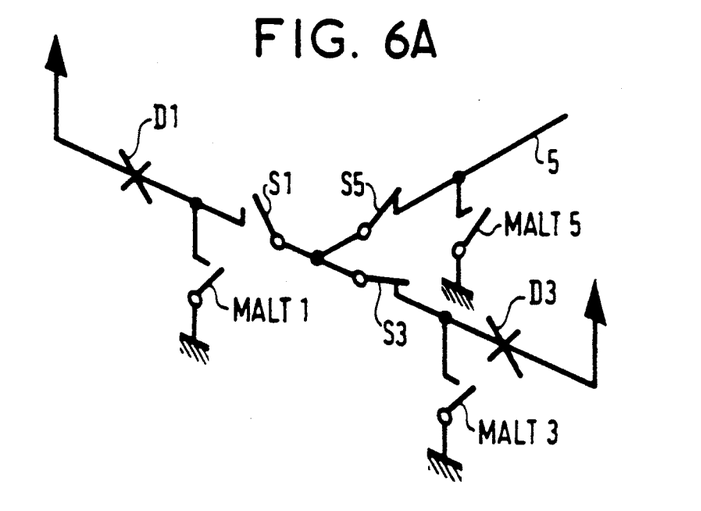

FIG. 6 shows the position of the shaft for the configuration shown in FIG. 6A, in which section switch S1 and all the grounding switches are open, with the section switches S3 and S5 being closed.

This position is obtained from the position in FIG. 5 by rotating the shaft clockwise through about 30 degrees.

Figure 7:
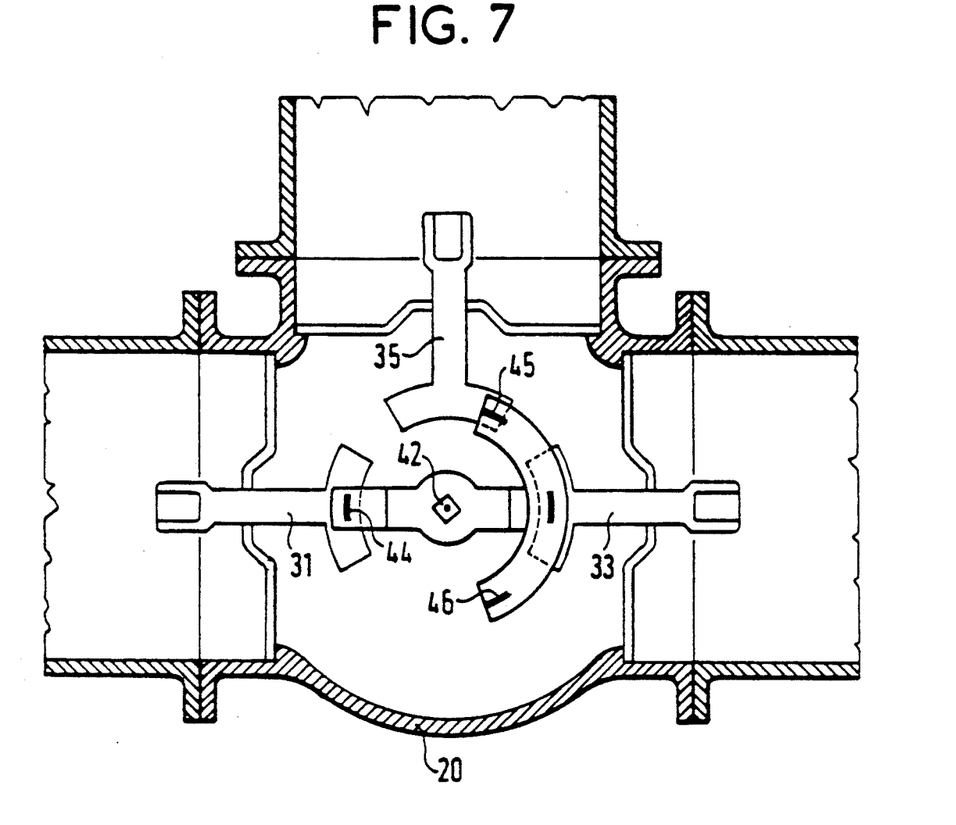
Figure 7A:
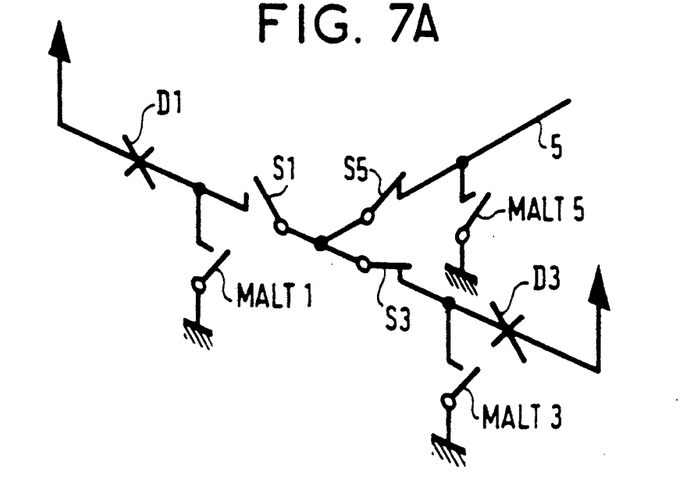

FIG. 7 shows the position of the shaft 42 for the configuration shown in FIG. 7A, in which section switch S1 is open and grounding switch MALT1 is closed, with section switches S3 and S5 being closed and grounding switches MALT3 and MALT5 being open. This configuration is obtained from the FIG. 6 configuration by rotating the shaft 42 clockwise through about 30 degrees, and corresponds to isolating and completely grounding the outlet at the end closer to the circuit-breaker D1, for maintenance thereof.

Figure 8:
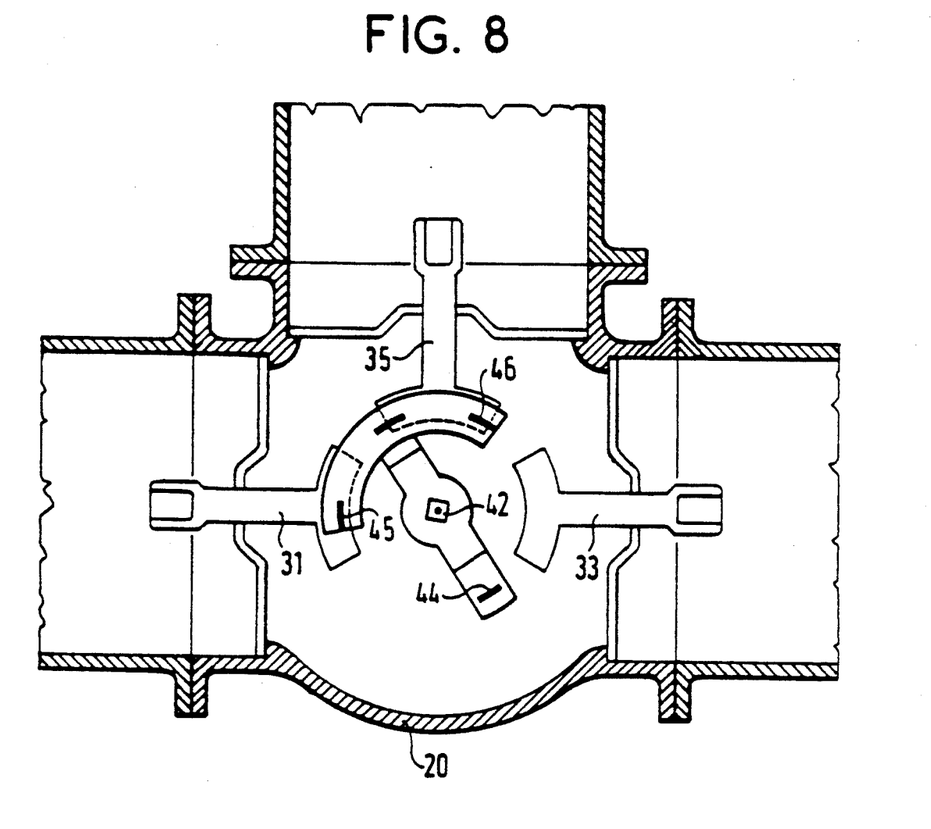
Figure 8A:
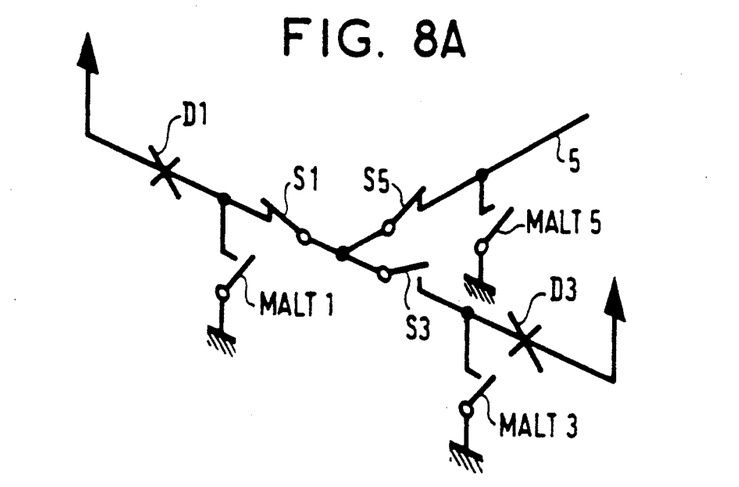

FIG. 8 shows the position of the shaft 42 for the electrical configuration shown in FIG. 8A, namely the outlet at the end closer to the circuit-breaker D3 being isolated, and the grounding switches being open. This position is symmetrical to the position shown in FIG. 6, about the set of busbars 35.

Figure 9:
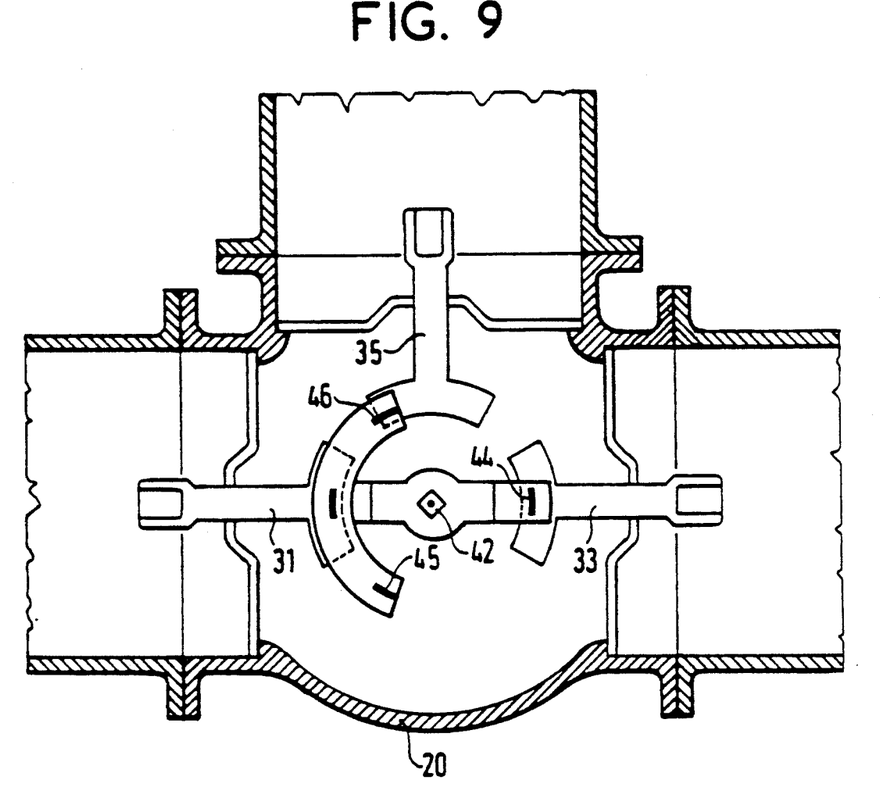
Figure 9A:
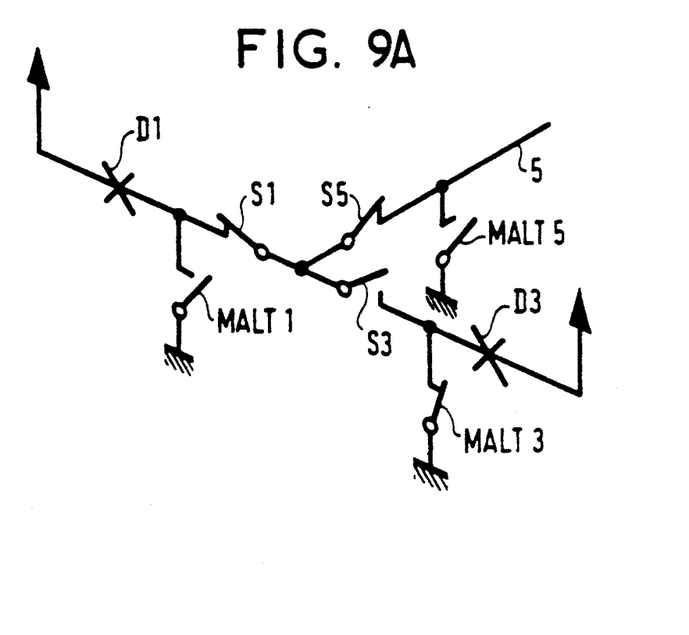

FIG. 9 shows the position of the shaft 42 in the electrical configuration shown in FIG. 9A, namely the outlet at the end closer to circuit-breaker D3 being isolated and grounded. This configuration is symmetrical to the FIG. 7 configuration.

Figure 10:
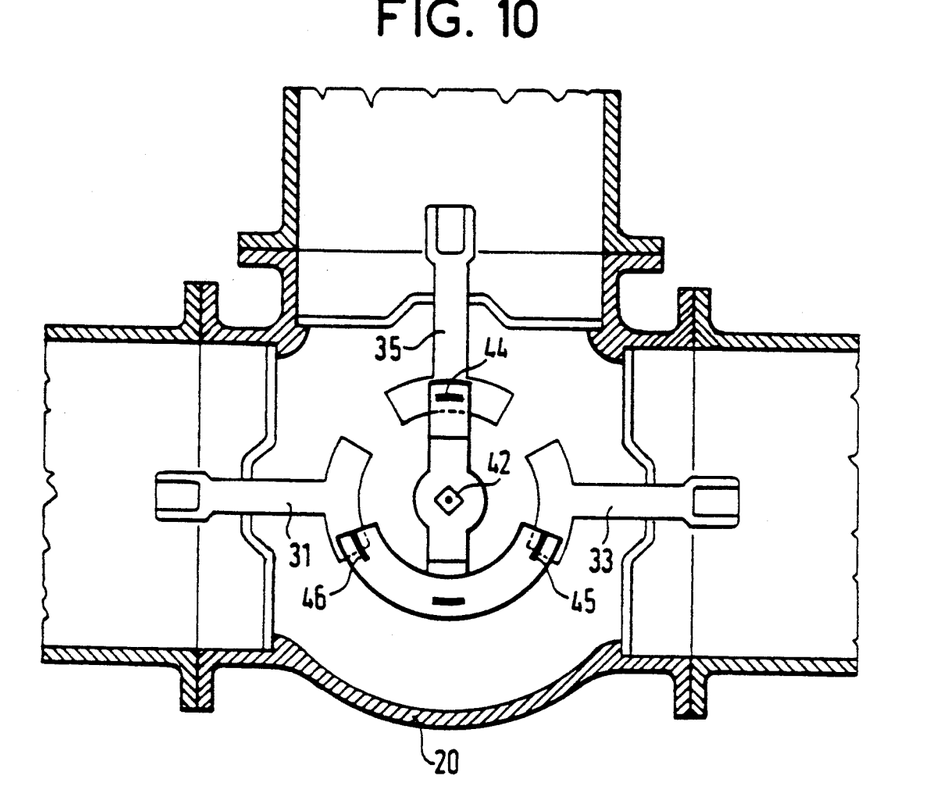
Figure 10A:
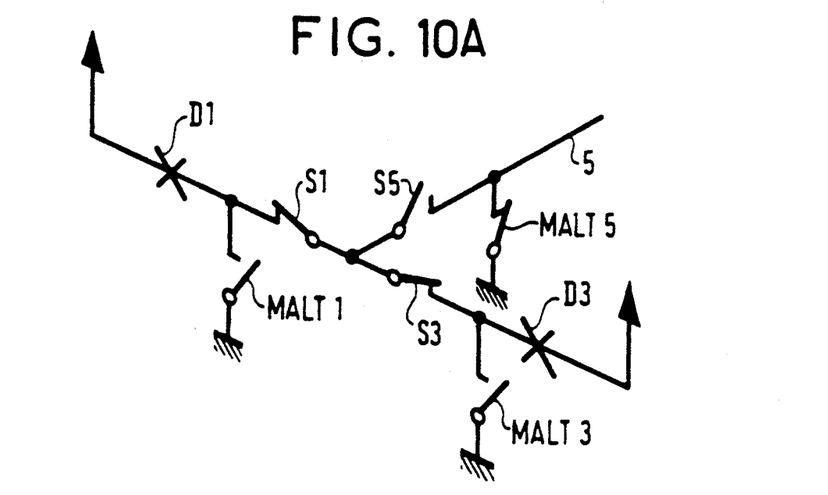

FIG. 10 shows the position of the shaft 42 for the electrical configuration shown in FIG. 10A, corresponding to the set of busbars 5 being grounded and isolated from the rest of the circuit. This position is obtained from the FIG. 5 position by rotating the shaft 42 through 180 degrees.

Figure 11:
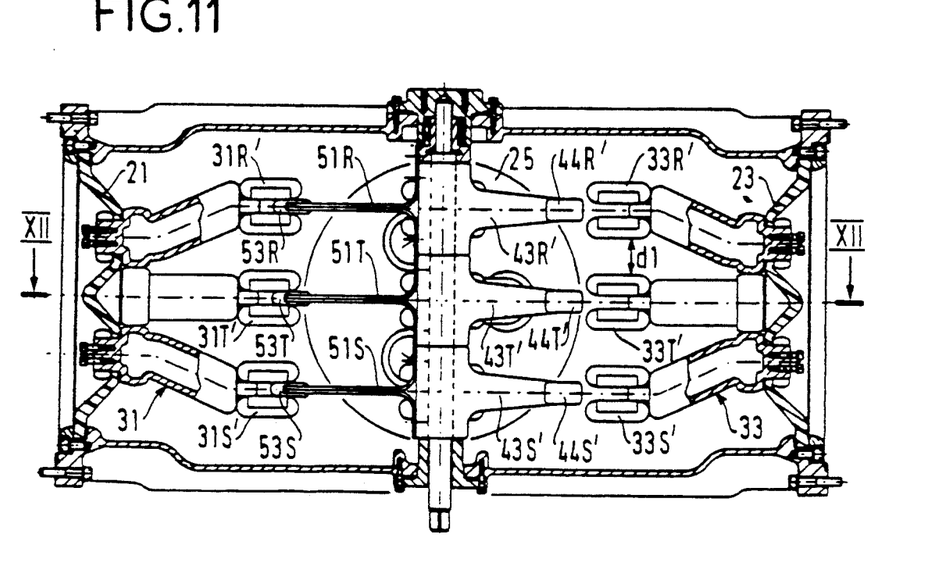
FIG. 11 is a fragmentary elevation view in axial section of a variant embodiment of the component of the invention.
Figure 12:
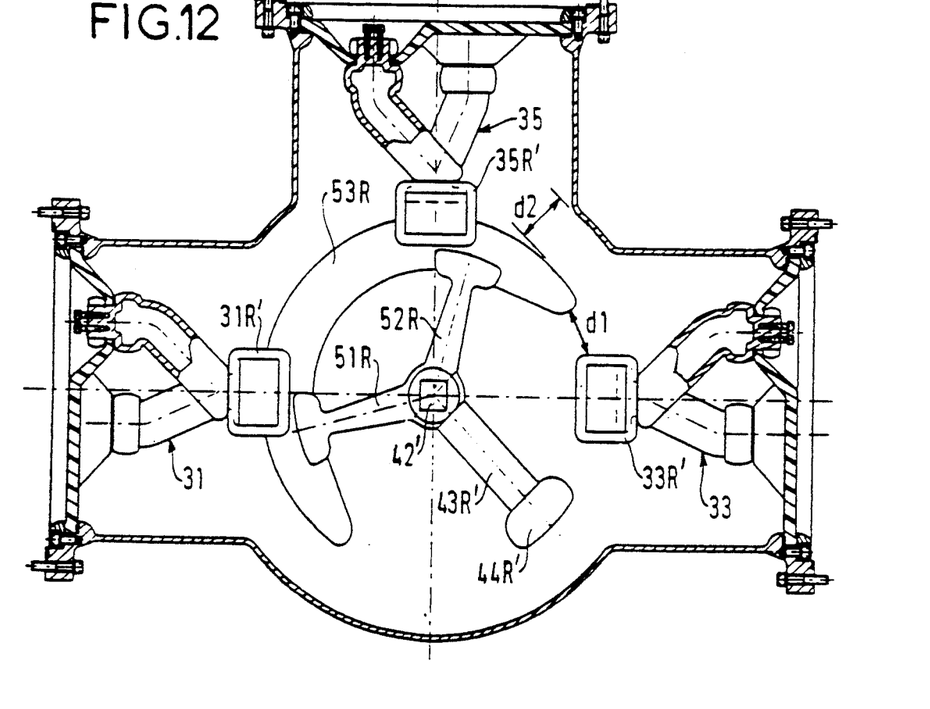
FIG. 12 is a view in section on the line XII—XII shown in FIG. 11.

FIGS. 11 and 12 show a second embodiment of the invention, in which the jaws are fixed and the male contacts are moving. This variant makes it possible to reduce the number of contacts to 3 and to lighten the weight of the moving assembly, thereby reducing the cost of the apparatus.

In FIGS. 11 & 12 and in FIG. 4, like components are given the same references.

The ends of the busbars in sets 31, 33, and 35 are equipped with jaws 31R', 31S', & 31T' for set 31, 33R', 33S', & 33T' for set 33, and 35R', 35S', & 35T' for set 35, in which only jaw 35R' is shown in FIG. 12.

The jaws occupy an angle in the approximate range 20 degrees to 25 degrees.

The shaft 42' of the moving assembly carries arms 43R', 43S', & 43T', at the ends of which contact parts 44R', 44S', & 44T' are fixed, which contact parts are electrically interconnected via a connector (not shown in the drawing) and connected to ground.

The shaft 42' also carries arms 51R, 51S, & 51T, and 52R, 52S, & 52T carrying contact parts 53R, 53S, & 53T. These contact parts are circular and extend over an angle of about 210 degrees, and more generally in the range 190 degrees to 220 degrees.

The dimensions of the parts are chosen so as to comply with isolation distances between the poles (d1) and between the poles and ground (d2).

The component shown in FIGS. 11 and 12 can be used to make the same configurations as the configurations described above with reference to FIGS. 5 to 10 (six positions).

A component of the invention enables a saving to made of up to nearly 70% compared with prior art devices.

The invention can be used in metal-clad installations having one grounded metal case per phase.

I claim:

1. A switching component for a metal-clad switching station including two outlets, said switching component being designed to provide the equivalent of three three-phase section switches respectively disposed on said two outlets powering a set of three-phase busbars, and to ground the section switches upstream therefrom, said switching component comprising: a gastight cladding filled with a gas having good dielectric properties, said cladding including a first opening and a second opening respectively closed off by means of first and second inserts made of an insulating material and disposed in axial alignment with each other, said cladding including a third opening closed off by means of a third insert made of an insulating material and having an axis perpendicular to a common axis of said first and second inserts, three sets of three-phase busbars passing through said inserts, respectively and being terminated inside the cladding by first contact parts, a rotary shaft disposed inside the cladding, passing therethrough in gastight manner, and adapted to be coupled with a drive member external of said cladding, said rotary shaft carrying a first set of three arms carrying second contact parts electrically connected together and to ground, said second contact parts being engagable with said first parts by rotation of said shaft about said shaft axis, said rotary shaft further carrying at least one second set of arms carrying third contact parts engagable with said first contact parts by rotation of said shaft, said second contact parts being sized and positioned to come into contact at any one time selectively with the first contact parts of one of said sets of busbars only, and said third contact parts being sized and positioned so as to come into contact at any one time with said first contact parts of all of said three sets of busbars, and to always be in contact with said first contact parts of two of said three sets of busbars.

2. A switching component according to claim 1, wherein said first contact parts are circular arcs.

3. A switching component according to claim 2, wherein said first contact arcs of two of said three sets of busbars corresponding to said two outlets extend over an angle lying in the range of 45 degrees to 60 degrees, said first contact arcs corresponding to the other set of said three sets of busbars extend over an angle lying in the range of 90 degrees to 110 degrees, and wherein busbars of the same phase for all of said three sets of busbars lie in the same plane, and wherein gaps extend between the adjacent ends of the first contact arcs of all of said three sets of busbars of the same phase with said gaps extending over an angle lying in the range of 15 degrees to 30 degrees.

4. A switching component according to claim 1, wherein said second contact parts and said third contact parts are jaws, and said third contact parts are circular arcs extending over an angle lying in the range of 125 degrees to 155 degrees.

5. A switching component according to claim 1, wherein said first contact parts are jaws, said second contact parts and said third contact parts are flat conductors engagable with said jaws, and wherein said third contact parts are circular arcs extending over an angle lying in the range of 190 degrees to 220 degrees.

* * * * *